United States Patent
Tokutake et al.

(10) Patent No.: US 7,292,913 B2
(45) Date of Patent: Nov. 6, 2007

(54) ARTICULATED ROBOT

(75) Inventors: Hideo Tokutake, Nagano (JP); Tatsuo Niimura, Nagano (JP)

(73) Assignee: Kabushiki Kaisha Koyama, Nagano (JP)

( * ) Notice: Subject to any disclaimer, the term of this patent is extended or adjusted under 35 U.S.C. 154(b) by 679 days.

(21) Appl. No.: 10/892,045

(22) Filed: Jul. 14, 2004

(65) Prior Publication Data

US 2005/0027398 A1 Feb. 3, 2005

(30) Foreign Application Priority Data

Aug. 1, 2003 (JP) ............................. 2003-205337
Jun. 15, 2004 (JP) ............................. 2004-177409

(51) Int. Cl.
*G05B 15/00* (2006.01)
*G05B 19/00* (2006.01)

(52) U.S. Cl. ...................... 700/264; 700/245; 700/246; 700/248; 700/250; 700/251; 700/252; 700/253; 700/254; 700/255; 700/257; 700/259; 700/260; 700/262; 318/568.1; 318/568.11; 318/568.13; 318/568.14; 318/568.16; 318/568.21; 318/568.23; 901/4; 901/43; 901/47

(58) Field of Classification Search ................. 700/245, 700/246, 248, 250, 251, 253, 254, 255, 257, 700/259, 260, 262, 264; 318/568.1, 268.11, 318/568.13, 568.14, 568.16, 568.21, 568.23; 219/125.1, 124.34; 901/4, 43, 47

See application file for complete search history.

(56) References Cited

U.S. PATENT DOCUMENTS 6,909,938 B2 * 6/2005 Hishikawa et al. ......... 700/188
7,203,568 B2 * 4/2007 Genma et al. .............. 700/169

2004/0158335 A1 * 8/2004 Fujibayashi et al. .......... 700/61
2005/0283275 A1 * 12/2005 Tokutake et al. ........... 700/245

FOREIGN PATENT DOCUMENTS

JP 05-233056 9/1993
JP 08-168982 7/1996

(Continued)

OTHER PUBLICATIONS

Hanafi et al., An active axis control system for a conventional CNC machine, 2003, IEEE, p. 1188-1193 vol. 2.*

(Continued)

*Primary Examiner*—Thomas Black
*Assistant Examiner*—Marc McDieunel
(74) *Attorney, Agent, or Firm*—Jordan and Hamburg LLP

(57) ABSTRACT

In the articulated robot, types of teaching a moving track of the robot can be optionally selected. The articulated robot comprises: a switch for manually selecting a moving axis to move an arm section along the selected axis; a manual pulse generator generating pulses; first controller for controlling motors to linearly move a front end of the arm section a prescribed distance, which corresponds to number of pulses; an operating board including a selecting switch, which is used to move the arm section along the selected axis; second controller for automatically controlling the motors so as to move the arm section while the selecting switch is turned on; third controller for stopping the motors to freely move the arm section while the arm section is manually moved; and a switch for selecting a type of teaching action.

2 Claims, 8 Drawing Sheets

FOREIGN PATENT DOCUMENTS

| | | |
|---|---|---|
| JP | 09-168985 | 6/1997 |
| JP | 9-198122 | 7/1997 |
| JP | 10-146782 | 6/1998 |
| JP | 2001-290527 | 10/2001 |
| JP | 2001-341092 | 12/2001 |

OTHER PUBLICATIONS

Nakamura et al., Multimedia communication pendant for sensor-based robotic task teaching by sharing information modular structure and application to sensing systems, 1998, IEEE, p. 1166-1171 vol. 2.*

* cited by examiner

ARTICULATED ROBOT

BACKGROUND OF THE INVENTION

The present invention relates to an articulated robot, which has a plurality of articulations and whose front end is automatically moved to predetermined object positions so as to execute jobs.

Articulated robots are installed in factories. A front end of each articulated robot is moved to prescribed positions so as to automatically execute welding, grinding, abrading, assembling, transporting, etc..

To automatically and efficiently execute such jobs, an optimum moving track of the robot is previously inputted to the robot. This step is called "teaching".

There are several methods of teaching actions. For example, an operator manually moves an arm section of the articulated robot to prescribed positions to teach a moving track (see Japanese Patent Gazette No. 2001-341092). This type is well known and suitable for quickly moving a light arm section. But, if the arm section is heavy, it is hard for the operator to move the arm section to object positions. Further, precise adjustment is difficult.

In some machining robots, teaching is executed by using a switch of an operation panel. Namely, an arm section is moved in an assigned direction as far as the operator pushes the switch (see Japanese Patent Gazette No. 10-146782). Even if the arm section is heavy, the operator is capable of easily executing the teaching action. However, the operator must turn on and off the switch many times so as to precisely move the arm section to object positions. Therefore, it takes a long time to correctly teach the arm section. Further, it is difficult to precisely position the front end by the switch. In some cases, the arm section collides with a work to be machined.

Further, in some robots, teaching is executed by inputting pulses, which are generated by a pulse generator. Namely, the arm section is moved a distance corresponding to number of inputted pulses (see Japanese Patent Gazette No. 9-198122). However, the operator must adjust a rotational angle of each articulation. Each articulation can be precisely controlled, but it is difficult to simultaneously control all articulations to correctly move the arm section. Therefore, this type is not practically used.

In some cases, the arm section may be roughly and quickly moved to one position, then it should be precisely moved to another position so as to efficiently move the arm section. However, in the conventional methods, actions of the arm sections are fixed.

SUMMARY OF THE INVENTION

The present invention was invented to solve the above described disadvantages of the conventional teaching methods.

An object of the present invention is to provided an articulated robot, in which a type of a teaching action can be selected from a plurality of types during the teaching action in one teaching process.

To achieve the objects, the present invention has following structures.

Namely, the articulated robot of the present invention comprises:

an arm section including a plurality of arms, which are pivotably connected by a plurality of articulations;

means for actuating the arms so as to move a front end of the arm section to an object position, which has been previously taught, in a rectangular coordinate system including three axes;

means for manually selecting one of the axes of the rectangular coordinate system so as to move the front end of the arm section along the selected axis for teaching the object position;

a manual pulse generator having a manually-operated rotary dial, the manual pulse generator generating pulses corresponding to a rotational angle of the rotary dial;

first control means for controlling the actuating means so as to move the arms and linearly move the front end of the arm section a prescribed distance, which corresponds to number of pulses generated by the manual pulse generator, along the selected axis;

an operating board including a selecting switch, which is used to move the front end of the arm section along the selected axis;

second control means for automatically controlling the actuating means so as to linearly move the front end of the arm section along the selected axis while the selecting switch selects the axis and being turned on;

third control means for stopping the actuating means so as to freely move the arms while the front end of the arm section is manually moved to the object position; and means for selecting the control means so as to select a type of teaching action.

With this structure, an operator can select the type of the teaching action from the three types: using the manual pulse generator; using the switch of the operating board; and manually moving the arm section. Especially, in the case of teaching a complex moving track to one object position, if the arm section may be roughly and quickly moved to a mid position, the operator selects the type of manually moving the arm section, then the third control means stops the actuating means, so that the operator can manually move the arm section to the mid position. Next, the arm section must be precisely moved from the mid position to the object position, the operator selects the type of using the switch, then the second control means controls the actuating means while the switch is turned on. To more precisely move the arm section, the operator selects the type of using the manual pulse generator, then the first control means controls the actuating means, so that the arm section can be precisely moved to the object position. Namely, the three types of teaching actions can be executed in one teaching process. Therefore, the teaching action can be easily, efficiently and precisely executed.

In the articulated robot of the present invention, the actuating means may include servo motors, and the second control means or the third control means may stop at least one of the servo motors when the front end of the arm section contacts an article and intensity of an electric current passing at least one of the servo motors exceeds a prescribed current intensity.

With this structure, the third control means stops at least one of the servo motors when the front end of the arm section contacts the article and intensity of the electric current passing at least one of the servo motors exceeds the prescribed current intensity, so that the arm section is slightly moved backward and a strain in the arm section, which is caused by the contact, is reduced or disappeared. In this state, the contact state still maintains, and the position of the front end of the arm section is detected on the basis of turning angles of the articulations as the object position. In the conventional teaching methods, the object position is detected in a state, in which the arm section contacts an article and is strained. Therefore, in the present invention, the object position can be precisely taught without applying a great strain to the arm section.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Preferred embodiments of the present invention will now be described in detail with reference to the accompanying drawing.

In the present embodiment, a work processing machine will be explained as the articulated robot of the present invention.

Figure 1:
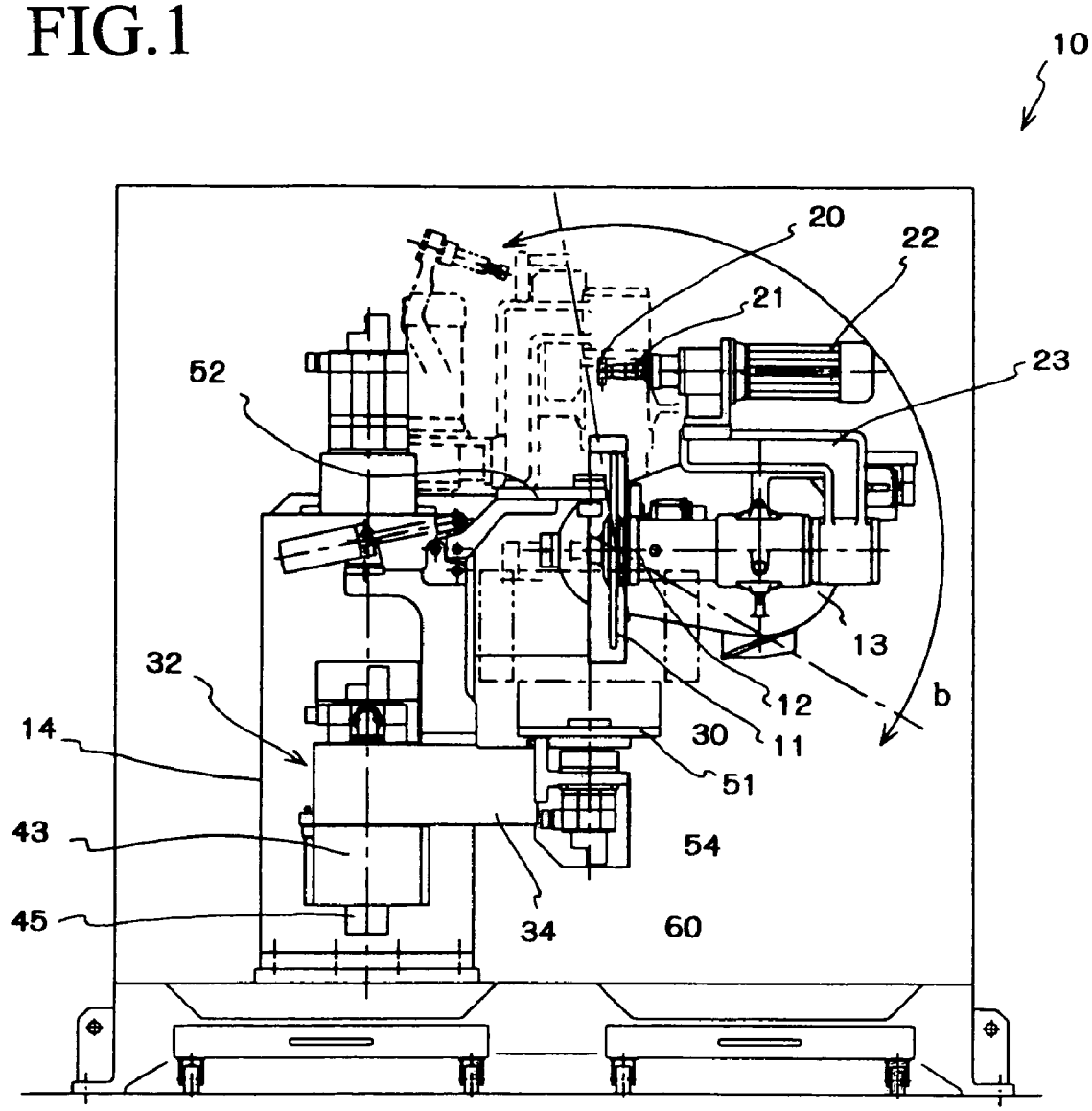
FIG. 1 is a front view of a work processing machine, which is an embodiment of the articulated robot of the present invention.
Figure 2:
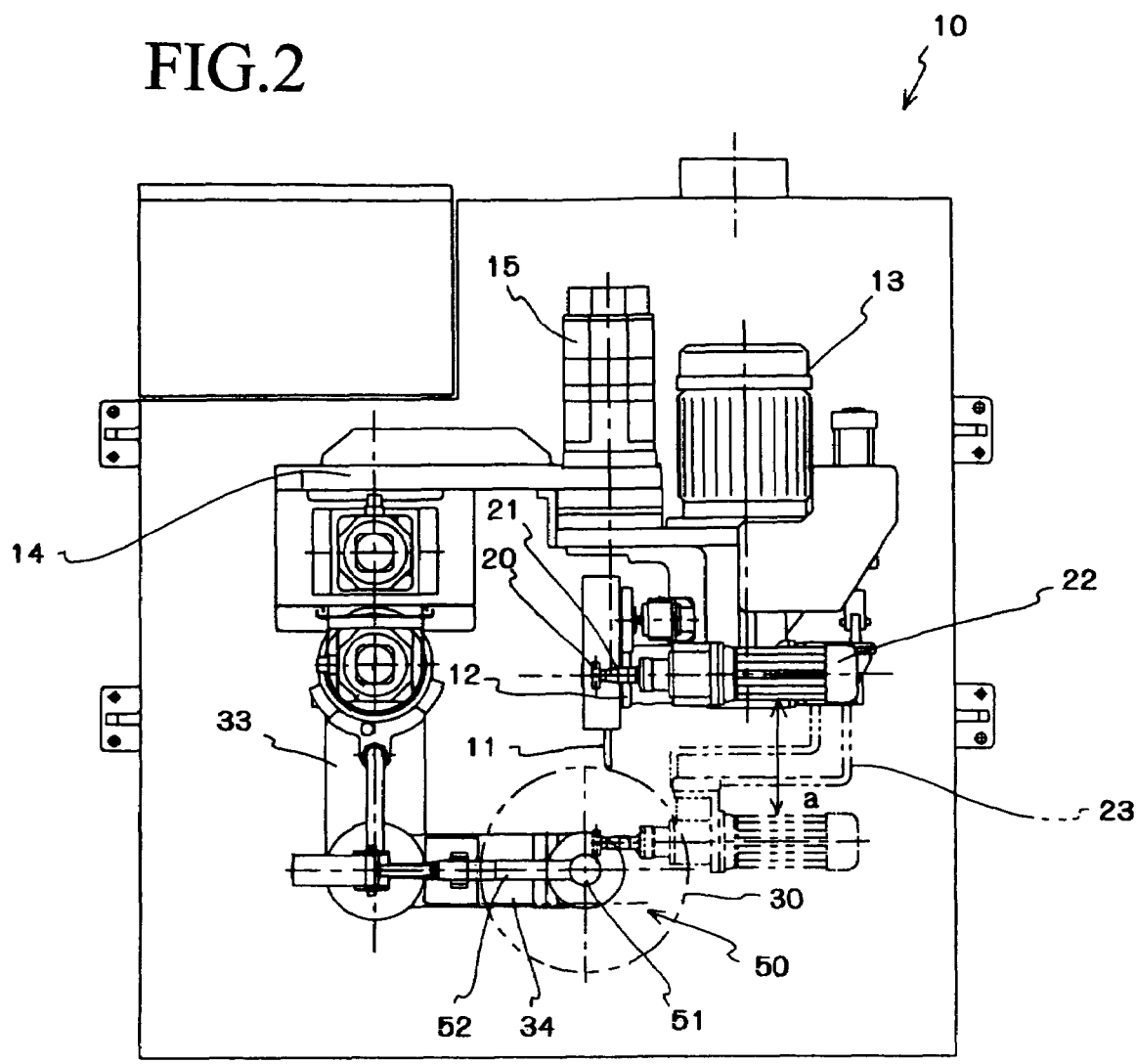
FIG. 2 is a plan view of the machine.
Figure 3:
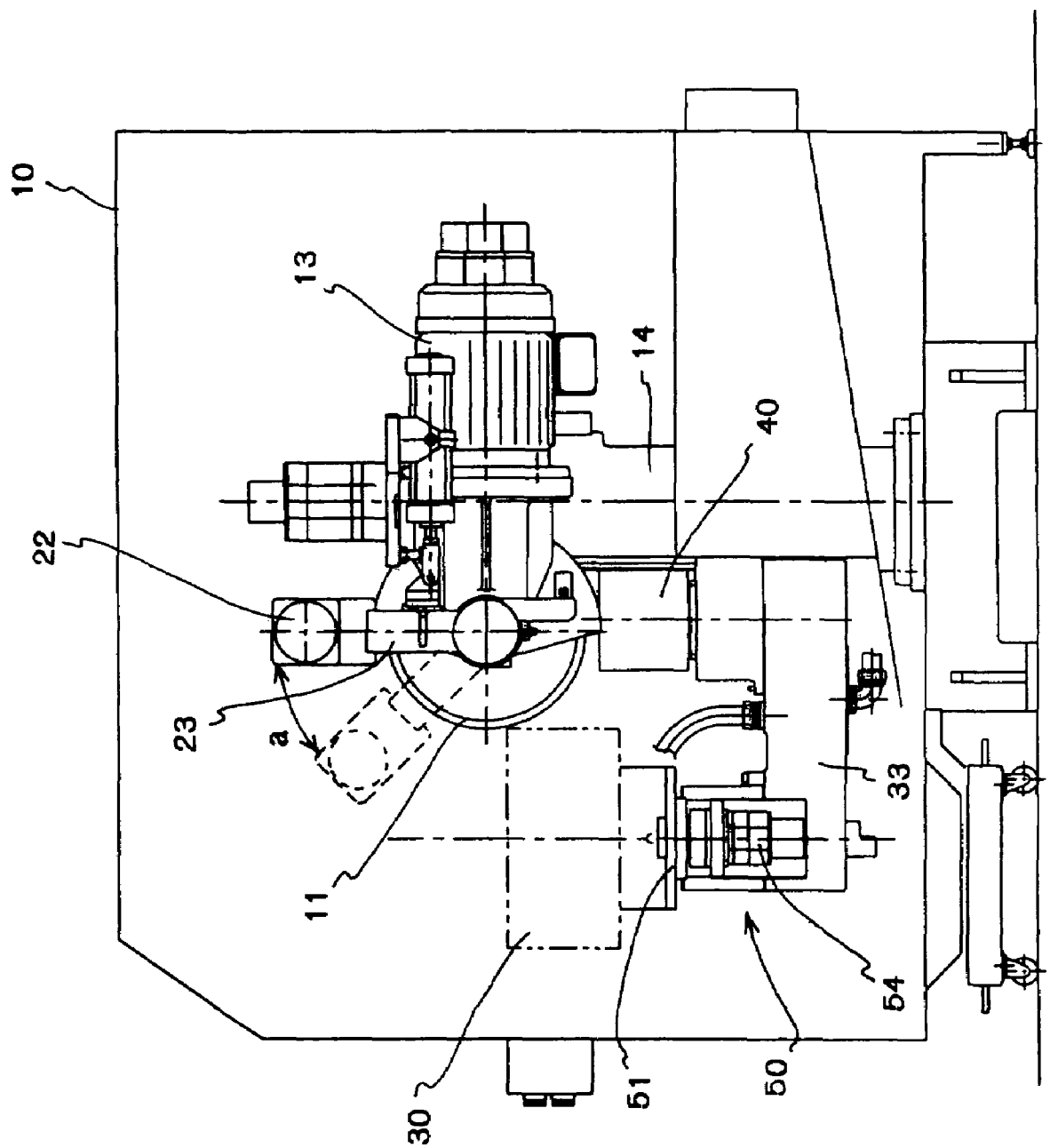
FIG. 3 is a side view of the machine.

FIG. 1 is a front view of the work processing machine 10; FIG. 2 is a plan view of the machine 10; and FIG. 3 is a side view of the machine 10.

The machine 10 includes: a rotary grinding stone 11; a bearing 12 for supporting a rotary shaft of the grinding stone 11; and a motor 13 for rotating the grinding stone 11. The members 11, 12 and 13 are supported on a base section 14 of the machine 10. The rotary shaft of the grinding stone 11 is horizontally supported.

The machine 10 further has a grinding stone 20, which is smaller than the grinding stone 11. The grinding stone 20 is supported by a bearing 21, and its rotary shaft is arranged in parallel to the rotary shaft of the grinding stone 11. A motor 22 rotates the grinding stone 20.

The grinding stone 20 is attached to an arm 23 and capable of moving around the grinding stone 11. The grinding stone 20 is moved in a direction "a" (see FIGS. 2 and 3).

The grinding stones 11 and 20 and the motors 13 and 22 are attached to the base section 14 and capable of turning in a vertical plane. They are turned in a direction "b" (see FIG. 1). Note that, a motor 15 turns the grinding stones 11 and 20, etc. in the vertical plane.

As described above, in the present embodiment, the machine 10 has two grinding stones 11 and 20, and their rotary shafts rotate in the vertical plane. However, the present invention is not limited to the present embodiment. For example, the machine 10 may have one grinding stone, and the grinding stones need not be turned in the direction "B"; they may be fixed.

A work 30 to be machined by the grinding stones 11 and 20 is mounted on a front end of an arm section 32, which includes a plurality of articulations.

The arm section 32 is moved so as to make the grinding stones 11 and 20 contact with the work 30 at various angles, so that the work 30 can be machined. Thus, the arm section 32, on which the work 30 is mounted, is moved before machining so as to teach a moving track of the work 30. This action is the teaching action.

Figure 4:
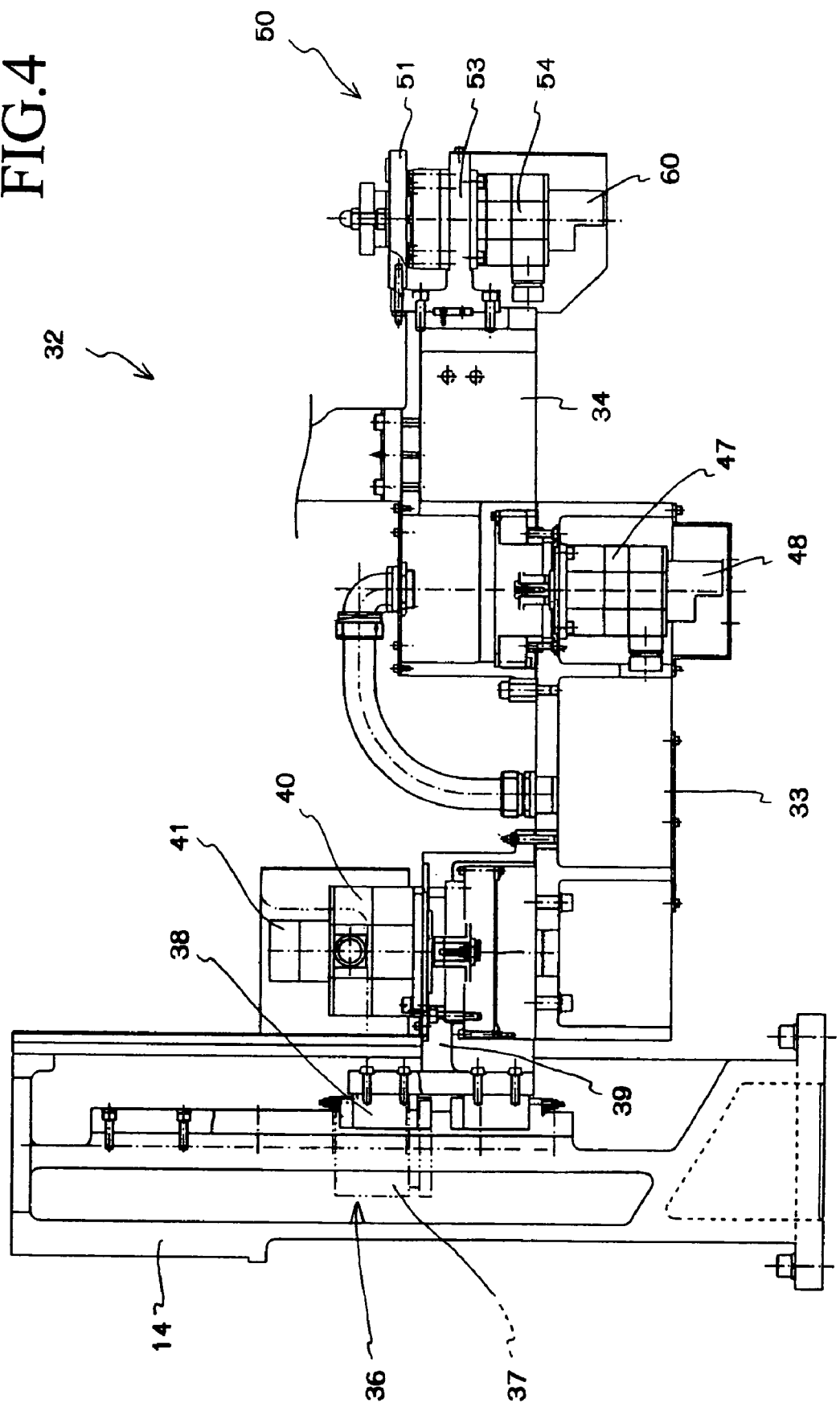
FIG. 4 is a side view of an arm section of the machine.
Figure 5:
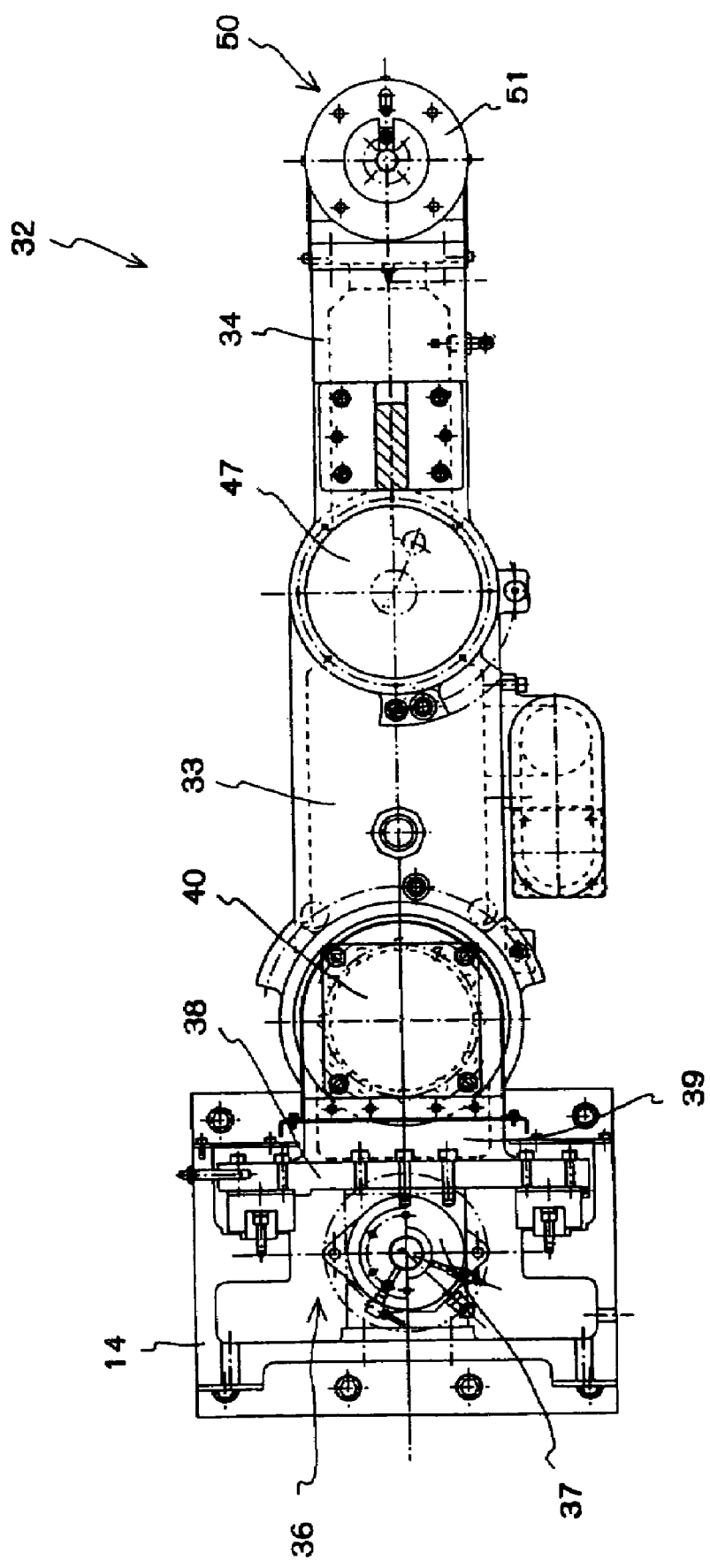
FIG. 5 is a plan view of the arm section.
Figure 6:
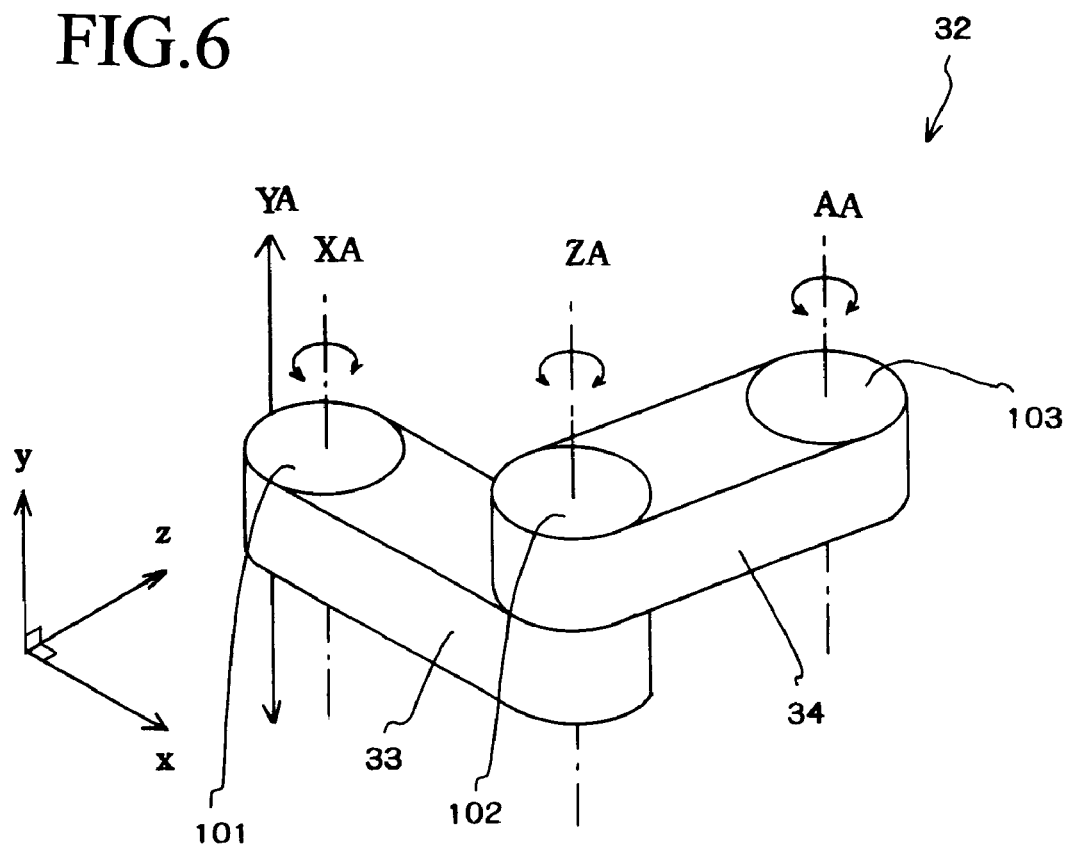
FIG. 6 is an explanation view of the arm section in a rectangular coordinate system.

Next, a structure of the arm section 32 will be explained with reference to FIGS. 4-6. Note that, FIG. 6 shows the arm section 32, whose structure is simplified in the drawing, in a rectangular coordinate system including axes of "x", "y" and "z").

In the arm section 32, a first arm 33 and a second arm 34 are pivotably connected by an articulation 102. A work holder 50, which is capable of holding the work 30, is provided to the front end of the second arm 34.

A base end of the first arm 33 is attached to the base section 14. The first arm 33 is capable of turning about a shaft 101, in a horizontal plane (an x-z plane) on the forward side of the base section 14.

The first arm 33 is vertically moved, in a direction YA, by driving means 36 together with the second arm 34. Namely, the base end of the first arm 33 is fixed to a moving body 38, which is vertically moved by a ball bearing screw 37, with a stay 39. With this structure, the first arm 33 can be moved in the vertical direction.

A motor 40 is fixed on an upper face of the stay 39. The shaft 101 is pierced through the stay 39 and connected to a motor shaft of the motor 40. The first arm 33 is fixed to the shaft 101. With this structure, the first arm 33 can be turned about an axis XA in the horizontal plane (the x-z plane).

An encoder 41 is provided to the motor 40 so as to detect an angular position of the first arm 33 about the axis XA.

A motor 43 (see FIG. 1) is provided to the base section 14 so as to rotate the ball bearing screw 37. An encoder 45 is provided to the motor 43 so as to detect an angular position of the ball bearing screw 37, so that the position of the first arm 33 in the direction YA can be known.

A base end of the second arm 34 is piled on a front end of the first arm 33 and capable of turning about the shaft 102. With this structure, the second arm 34 is capable of turning in the horizontal plane (the x-z plane), which is parallel to the first arm 33.

A motor 47 is provided on a lower face of the front end of the first are 33. The shaft 102, which is pierced through the arms and connected to a motor shaft of the motor 47. A base end of the second arm 34 is fixed to the shaft 102. With this structure, the second arm 34 is capable of turning, about an axis ZA, in the horizontal plane.

An encoder 48 is provided to the motor 47 so as to detect an angular position of the second arm 34 about the axis ZA.

As described above, the work holder 50 is attached to the front end of the second arm 34. The work holder 50 has a lower member 51 and an upper member 52, which are capable of clamping the work 30. The lower member 51 is attached to a stay 53 provided to the front end of the second arm 34.

A motor 54 is provided on a lower face of the stay 53. A shaft 103 is vertically pierced through the stay 53 and connected to a motor shaft of the motor 54. The lower member 51 is fixed to the shaft 103. The shaft 103 is arranged in the vertical direction (the y-direction) or in the direction perpendicular to the horizontal plane, in which the second arm 34 is turned.

Therefore, the lower member 51 is capable of turning in a plane, which is parallel to the horizontal plane in which the second arm 34 is turned, about an axis AA.

An encoder 60 is provided to the motor 54 so as to detect an angular position of the work 30 about the axis AA.

As shown in FIG. 6, the arm section has four axes: the three rotation axes XA, ZA and AA and one linear motion axis YA. The shafts 101, 102 and 103, which are respectively arranged in the directions of the axes XA, ZA and AA, constitute the articulations.

The rotary shafts 101, 102 and 103 are arranged in the vertical direction; the arms 33 and 34 are turned in the horizontal plane. Therefore, the articulated robot is a so-called horizontal type articulated robot.

Note that, in the present embodiment, an operator can move the arm section 23 in the rectangular coordinate system including the horizontal axes "x" and "z" (the x-z plane) and the vertical axis "y".

Figure 7:
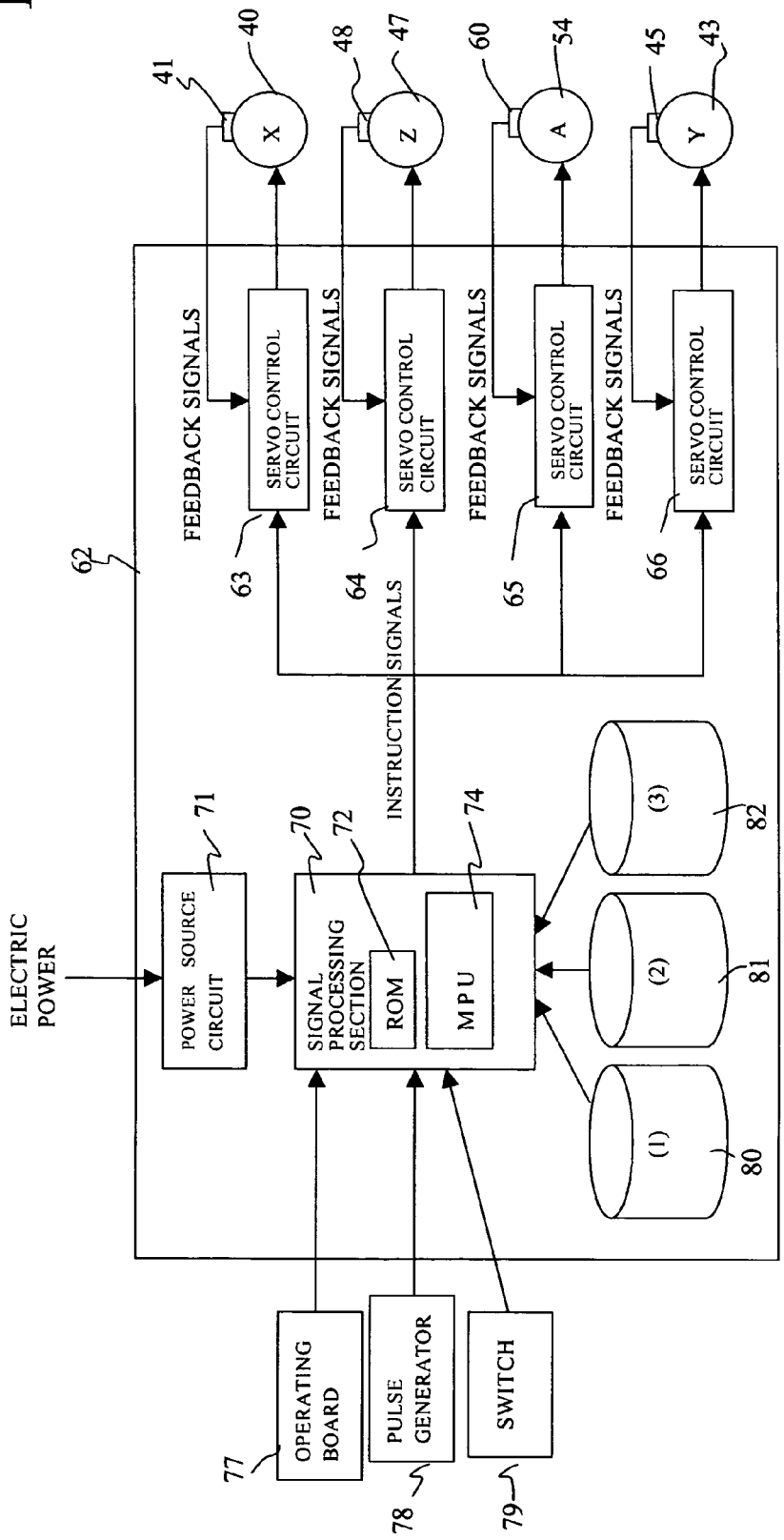
FIG. 7 is a block diagram of a control system of the machine.

A control system of the machine 10 will be explained with reference to FIG. 7.

The control system 62 controls the motors 40, 43, 47 and 54, which turn the shafts 101, 102 and 103 and vertically move the first arm 33, so as to teach the moving track of the arm section 23. Namely, in the present embodiment, the motors 40, 43, 47 and 54 act as the actuating means of the claims. In the present embodiment, the control system 62 includes a programmable controller, which can be programmed by the operator, and the motors 40, 43, 47 and 54 are servo motors.

The control system 62 comprises: servo control circuits 63, 64, 65 and 66 for respectively servo-controlling the motors 40, 47, 54 and 43; a signal processing section 70 for instructing rotational speed of the motors 40, 47, 54 and 43 to the servo control circuits 63, 64, 65 and 66; and a power source circuit 71.

The signal processing section 71 is connected to at least one memory. In the present embodiment, the signal processing section 71 is connected to three memory means 80, 81 and 82, e.g., ROMs, in each of which control programs have been previously stored.

The signal processing section 70 includes a ROM 72 storing an operating system, e.g., OS72, and an MPU 74, which executes the control programs. The operating system controls the MPU 74, the servo control circuits 63, 64, 65 and 66, etc. on the basis of commands and signals inputted from an operating board 77 and a manual pulse generator 84.

In the present embodiment, the moving track of the arm section 32 can be taught by three types of teaching actions: (1) manually moving the arm section 23; (2) using switches of the operating board 77; and (3) using the manual pulse generator 84. The memory means 80, 81 and 82 respectively store the control programs of the three types of teaching actions (1), (2) and (3). The MPU 74 controls the servo control circuits 63, 64, 65 and 66 on the basis of the control programs.

Namely, in the present embodiment, the signal processing section 70 act as the first, the second and the third control means of the claims.

Signals indicating the angular positions and rotational speeds sent from the encoders 41, 48, 60 and 45, which are respectively provided to the motors 40, 47, 54 and 43, are feed-backed to the servo control circuits 63, 64, 65 and 66. The servo control circuits 63, 64, 65 and 66 respectively control the motors 40, 47, 54 and 43 so as to decrease differences between the instructed angular positions and rotational speeds, which have been sent from the signal processing section 70, and the actual angular positions and rotational speeds, which have been detected by the encoders 41, 48, 60 and 45.

Next, the teaching actions of the machine 10 will be explained.

The operator optionally selects the type of teaching action from the three types. The operator can select the type by a selecting switch 79.

Teaching by Manually Moving the Arm Section

When the operator selects the type of manually moving the arm section 32 by the switch 79, the signal processing section 70 reads the control program from the memory means 80, then the MPU 74 executes the control program.

Upon selecting this type of teaching action, the signal processing section 70 instructs the servo control circuits 63, 64, 65 and 66 to stop supplying electric currents to the motors 40, 47, 54 and 43.

Upon receiving the stop signals, the servo control circuits 63, 64, 65 and 66 stop supplying the electric currents so as to stop the motors 40, 47, 54 and 43.

When the motors 40, 47, 54 and 43 are stopped, the arm section 32 can be freely turned and moved. Therefore, the operator can manually move the arm section 32 so as to move the front end 50 of the arm section 32 along a desired moving track.

Teaching by Using Switches of the Operating Board

When the operator selects the type of using the switch of the operating board 77, the signal processing section 70 reads the control program from the memory means 81, then the MPU 74 executes the control program.

In this type of teaching action, the operator can move the arm section 32 to an object position by using the switch of the operating board 77.

Figure 8:
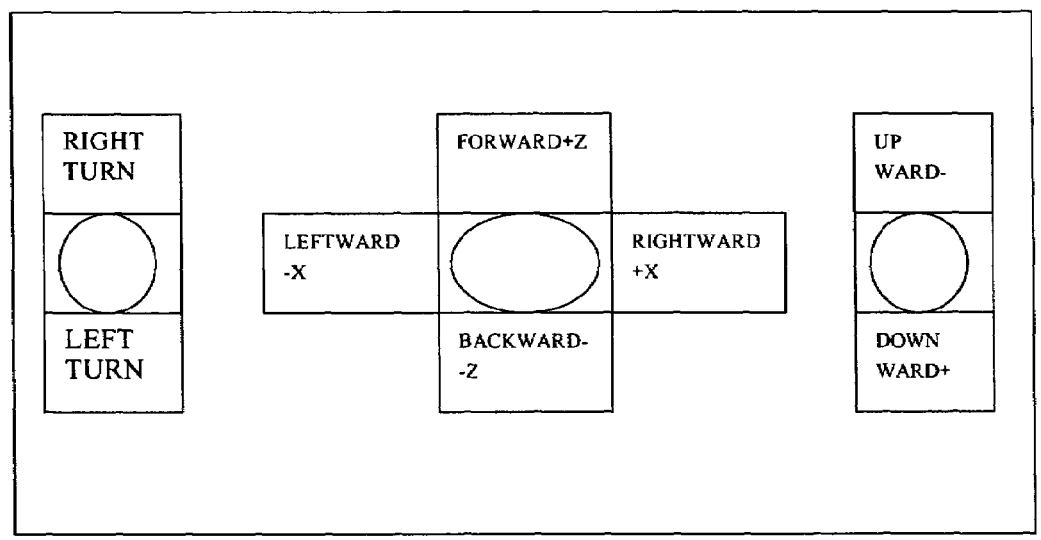
FIG. 8 is a front view of an operating board of the machine.

A front view of the operating board 77 is shown in FIG. 8. The operating board 77 includes a touch panel, so the operator touches switches displayed in a screen of the touch panel so as to control motions of the arm section 32.

To move the front end 50 of the arm section 32 in the horizontal plane (the x-z plane), the operator uses switches "FORWARD+z", "BACKWARD−z", "RIGHTWARD +x" and "LEFTWARD−x". The switch "FORWARD+z" is used to horizontally move the front end 50 of the arm section 32 forward (the plus direction in the z-axis direction); the switch "BACKWARD−z" is used to horizontally move the front end 50 of the arm section 32 backward (the minus direction in the z-axis direction); the switch "RIGHTWARD+x" is used to horizontally move the front end 50 of the arm section 32 rightward (the plus direction in the x-axis direction); and the switch "LEFTWARD−x" is used to horizontally move the front end 50 of the arm section 32 leftward (the minus direction in the x-axis direction).

The operating board 77 further includes: a "RIGHT TURN" switch for turning the work holder 50, which is provided at the front end of the arm section 32, to the right; a "LEFT TURN" switch for turning the work holder 50 to the left; an "UPWARD−" switch for vertically moving the arm section 32 upward; and a "DOWNWARD+" switch for vertically moving the arm section 32 downward.

The operator moves the work 30, which is held at the front end of the arm section 32, to the object position by using the switches of the operating board 77.

For example, by turning the switches on, commands for moving the work 30 in a prescribed direction are inputted to the signal processing section 70. Upon receiving the commands, the signal processing section 70 calculates rotational angles of the motor shafts of the motors 40, 47, 54 and 43 so as to move the work 30 in a direction instructed by the switch. The calculation is performed by: dividing a line extended in the instructed direction from the present position by a unit distance, which has been previously determined; and calculating the rotational angle of each motor for moving the work 30 to a terminal end of each unit distance. The signal processing section 70 sends instruction signals, which respectively indicate the calculated rotational angles of the motors 40, 47, 54 and 43 for moving the work 30 to each of the terminal ends, to the servo control circuits 63, 64, 65 and 66.

The servo control circuits 63, 64, 65 and 66 respectively compare the present actual rotational angles of the motors 40, 47, 54 and 43 with the calculated rotational angles thereof. Then, the servo control circuits 63, 64, 65 and 66 respectively supply electric currents to the motors 40, 47, 54 and 43 so as to reduce the differences between the actual rotational angles and the calculated rotational angles.

The servo control circuits 63, 64, 65 and 66 simultaneously control the motors 40, 47, 54 and 43. Therefore, the work 30 is linearly moved, by unit distances, in the instructed direction.

By repeating this action, the work 30 is moved toward the grinding stone 11 or 20, and finally contacts the grinding stone 11 or 20.

The motors 40, 47, 54 and 43 rotates until the servo control circuits 63, 64, 65 and 66 detects that intensity of the electric current passing at least one of the motors 40, 47, 54 and 43 exceeds a prescribed current intensity. Namely, the arms 33 and 34 move the work 30 as far as the motors 40, 47, 54 and 43 are rotated.

When at least one of the servo control circuits 63, 64, 65 and 66 detects that intensity of the electric current passing the motor exceeds the prescribed current intensity, a great force is applied to the arms 33 and 34. Namely, the arms 33 and 34 are strained, or the lower member 51 is inclined with respect to the second arm 34 or the vertical line.

In the conventional methods, the object position is taught in that strained or inclined state. Therefore, in an actual machining process, the taught object position is slightly different from the actual object position.

To solve the problem, in the present embodiment, if intensity of the electric current passing at least one of the servo motors 40, 47, 54 and 43 exceeds the prescribed current intensity, the servo control circuit, which corresponds to the overloaded motor, sends an overload signal to the signal processing section 70.

Upon receiving the overload signal, the signal processing section 70 sends servo-off signals to a part of or all of the servo control circuits 63, 64, 65 and 66 so as to stop supplying electric currents.

With this action, a part of or all of the motors 40, 47, 54 and 43 are stopped, and the motor shafts are freely rotated. Therefore, the great force, which presses the work 30 to the grinding stone 11 or 20 or which inclines the lower member 51, disappears.

Namely, the work 30 is slightly moved backward until a counter force, which is applied to the arms 33 and 34 and the lower member 51 from the grinding stone 11 or 20, is balanced with mechanical forces in the arms 33 and 34, the lower member 51, etc., which are caused by lost motions, rolling friction, starting torque, etc..

By slightly moving the work 30 backward, applying a great force to the work 30, the grinding stone 11 or 20, the arms 33 and 34, or the lower member 51 can be prevented. Therefore, damaging them can be prevented.

Even if the arm 33 and 34 are slightly moved backward, the mechanical forces in the arms 33 and 34, the lower member 51, etc. bias the work 30 toward the grinding stone 11 or 20, so that the work 30 can maintain to contact the grinding stone 11 or 20 with a suitable contact pressure.

Teaching by Manual Pulse Generator

When the operator selects the type of using the manual pulse generator 84, the signal processing section 70 reads the control program from the memory means 82, then the MPU 74 executes the control program.

Figure 9:
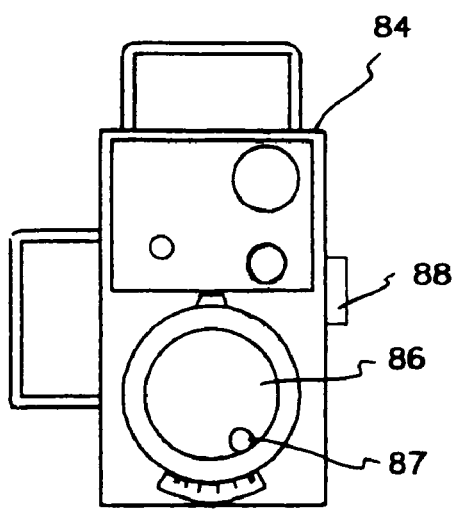
FIG. 9 is a front view of a manual pulse generator of the machine.

Firstly, the manual pulse generator 84 will be explained with reference to FIG. 9.

The manual pulse generator 84 has a rotary dial 86 and outputs prescribed number of pulses for each one turn of the rotary dial 86. There is provided a handle 87 for manually turning the dial 86 in a front face of the dial 86.

The manual pulse generator 84 has a switch 88 for selecting the axis of the rectangular coordinate system, along which the arm section 32 is moved. For example, the operator selects the x-, the y- or the z-axis by the switch 88. Further, the operator can select turning the lower member 51 about the axis AA by the switch 88.

In the present embodiment, one turn of the dial 86 is divided into 100 divisions, so the manual pulse generator 84 generates 100 pulses when the operator turns the dial 86 once. The pulses are sent to the signal processing section 70.

If the operator turns the dial 86 fast, pulse separations are made short; if the operator turns the dial 86 slowly, pulse separations are made long. By changing the rotational speed of the dial 86, a moving speed of the arm section 32 during the teaching action can be changed.

Conventionally, the manual pulse generator 84 has been used for NC processing machines so as to position works and tools.

A characteristic of the present embodiment is to employ the manual pulse generator 84 so as to teach the moving track of the arm section 32, which is not directly operated in the rectangular coordinate system.

The pulses generated by the manual pulse generator 84, an axis signal indicating the axis selected by the selecting switch 88, and a distance signal indicating a moving distance of the front end 50 of the arm section 32, which corresponds to the one division of the dial 86, are inputted to the signal processing section 70.

When the signal processing section 70 receives the signals, the signal processing section 70 performs the calculation so as to move the arm section 32 in the assigned direction. As described above, the signal processing section 70 calculates the rotational angles of the motor shafts of the motors 40, 47, 54 and 43 for moving the front end 50 of the arm section 32 to the terminal end of each unit distance.

The calculated rotational angles are respectively sent to the servo control circuits 63, 64,65 and 66.

In the present embodiment, the actual moving distance of the front end 50 with respect to one pulse, which is generated by the pulse generator 84, can be determined by the selecting switch 88.

For example, one turn of the dial 86 is divided into 100 divisions, and the one division may be selectively corresponded to 0.1 mm, 0.01 mm or 0.001 mm.

The actual moving distance of the front end 50 of the arm section 32 corresponding to one division of the dial 86 can be selectively determined. Therefore, the actual moving distance with respect to one pulse can be smaller when the front end 50 is close to an object position, so that teaching the moving track can be rapidly and precisely performed.

When the work 30 contacts the grinding stone 11 or 20 and at least one of the servo control circuits 63, 64, 65 and 66 detects that intensity of the electric current passing the motor exceeds the prescribed current intensity, the servo control circuit, which corresponds to the overloaded motor, sends the overload signal to the signal processing section 70. Upon receiving the overload signal, the signal processing section 70 sends servo-off signals to a part of or all of the servo control circuits 63, 64, 65 and 66 so as to stop supplying electric currents. With this action, a part of or all of the motors 40, 47, 54 and 43 can be stopped.

By this control, applying a great force to the work 30, the grinding stone 11 or 20, the arms 33 and 34, or the lower member 51 can be prevented. Therefore, damaging them can be prevented.

In the present embodiment, the operator can optionally select the type of the teaching action from the above described three types.

The type of the teaching action can be freely changed while teaching a moving track to one object position. For example, in the case of teaching a moving track to one object position, if the arm section 32 may be roughly and quickly moved to a mid position close to the object position, the operator selects the type of manually moving the arm section 32. Then, the operator selects the type of using the switch of the operating board 77 or using the manual pulse generator 84, so that the arm section 32 can be precisely moved to the object position.

When the front end of the arm section 32 or the work 30 reaches the object position with combining the three types of teaching actions, the object position must be stored.

The object position is stored by using a storing switch (not shown) of the operating board 77. Namely, the signal processing section 70 stores the rotational angles of the motor shafts of the motors 40, 47, 54 and 43, which are detected by the encoders 41, 48, 60 and 45, so that the object position of the work 30 can be stored.

In the present embodiment, the work processing machine 10 is explained as the articulated robot of the present invention, but the present invention is not limited to the embodiment.

In the present embodiment, the machine 10 has four axes XA, ZA AA and YA, but number of axes is not limited, so the articulated robot may have three axes, five axes, etc..

Further, the coordinate system, in which the articulated robot is moved, is not limited to the rectangular coordinate system.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An articulated robot,
comprising:
an arm section including a plurality of arms, which are pivotably connected by a plurality of articulations;
means for actuating the arms so as to move a front end of said arm section to an object position, which has been previously taught, in a rectangular coordinate system including three axes;
means for manually selecting one of the axes of the rectangular coordinate system so as to move the front end of said arm section along the selected axis for teaching the object position;
a manual pulse generator having a manually-operated rotary dial, said manual pulse generator generating pulses corresponding to a rotational angle of the rotary dial;
first control means for controlling said actuating means so as to move the arms and linearly move the front end of said arm section a prescribed distance, which corresponds to number of pulses generated by said manual pulse generator, along the selected axis;
an operating board including a selecting switch, which is used to move the front end of said arm section along the selected axis;
second control means for automatically controlling said actuating means so as to linearly move the front end of said arm section along the selected axis while the selecting switch selects the axis and being turned on;
third control means for stopping said actuating means so as to freely move the arms while the front end of said arm section is manually moved to the object position; and
means for selecting said control means so as to select a type of teaching action.

2. The articulated robot according to claim 1,
wherein said actuating means includes servo motors, and said second control means or said third control means stops at least one of the servo motors when the front end of said arm section contacts an article and intensity of an electric current passing at least one of the servo motors exceeds a prescribed current intensity.

* * * * *